Patented Apr. 23, 1940

2,198,379

UNITED STATES PATENT OFFICE 2,198,379

WATER SOFTENING PROCESS

Carleton Ellis, Montclair, N. J., assignor to Ellis-Foster Company, a corporation of New Jersey No Drawing. Application December 14, 1936,
Serial No. 115,813

5 Claims. (Cl. 210—24)

Throughout this specification it is to be understood that where no temperatures of treatment are given, the materials may be initially at ordinary atmospheric temperatures. It will be understood that in conducting those reactions which are inherently exothermic, the temperature of the materials undergoing reaction will be modified by such reactions.

This invention relates to the purification of water by the use of an organic base-exchange material and a process for activating and regenerating the base-exchange material. The base-exchange material is not only useful for purifying and softening water but also for the removal of even small amounts of certain other dissolved substances from aqueous solution. The invention relates specifically to the use of a novel type of base-exchange material derived from organic agents such as tannins (which may be present as components of vegetable substances such as woody material), by treatment with sulphuric acid and the like, and to a method for subsequent treatment to restore or accentuate the base-exchange properties. An important aspect of the process is the removal of calcium and/or magnesium from hard waters.

The use of substances capable of base-exchange, that is, having the property of absorbing a given cation from solution and replacing it with another more innocuous cation, has been known and practiced for decades, but in commercial practice, such materials have been almost exclusively of an inorganic nature such as zeolites. I have discovered a method whereby tannins and other bodies (either synthetic or naturally occurring) may be treated so that they acquire base-exchange properties. The products may be manufactured cheaply and simply from inexpensive materials and are efficient and economical.

Tannins, for example, suitable as raw materials may include quebracho, chestnut extract, gambier, cutch, hematine, tannic acid, sumac or fustic. Thus, for example, I may take a chestnut extract, preferably in solid or powder form, and add it to an excess of, e. g., concentrated sulphuric acid of specific gravity 1.86, allowing the two to react for several minutes. The action of the strong acid on the tannin material gives an exothermic reaction causing the mass to heat up considerably. The temperature attained by this mixture of acid and tannin material will depend upon a large number of factors. But merely mixing the materials will not usually cause sufficient heating to injure the base-exchange property of the solid reaction product. The temperature at this stage should not exceed 150° C., if a satisfactory product is to be secured. A certain amount of charring, dehydration, sulphation or sulphonation and oxidation occurs yielding a dark colored or black mass ranging from soft and plastic to hard and brittle. The whole is dumped into a large volume of water and the solid particles are separated by a suitable means such as filtration or decantation, and further washed if desired. It is advisable to wash until substantially free of acid, which operation obviously will remove other water-soluble materials present. I prefer to wash and dry the product as this serves to improve the granule characteristics such as porosity and crushing strength, but it may be used without drying.

After treatment with the acid the material is ordinarily obtained in a variety of particle sizes. It may be crushed or ground and classified by screening, and this may take place before washing so that the latter process is facilitated; but screening may be accomplished more easily and more successfully after drying.

Having then the washed, dried, and screened material, it may be used at once if desired. I prefer, however, to augment the base-exchange properties by several cycles of exhaustion and regeneration, after which the products exhibit increased base-exchange properties. This may be accomplished by loading a water-softening device (or simply a container which will allow water to pass through its bottom) with the insoluble product obtained by action of the acid on tannin and allowing a water which contains considerable amounts of a cation, for example calcium, to filter through the mass of said base-exchange material. After the material is thoroughly exhausted it may be regenerated with a suitable solution, for instance dilute acid or a sodium chloride brine. Another method is to place the acid-treated material in a container and digest it, possibly with occasional agitation, in a cation-containing solution, decanting, and further digesting in a regenerating solution. The cycle of exhaustion and regeneration is repeated a sufficient number of times until the magnitude of increase in base-exchange capacity shows further treatment to be unnecessary.

The number of activating cycles may be reduced by increasing the concentration of the exhausting and regenerating solutions, whereby the effect is intensified. Care should be taken, however, not to use such concentrated solutions as will cause disintegration of the base-exchange agent.

The activated material may be used without again drying, if desired. A suitable method of use is to place the mass in an apparatus which will permit water to run through either by gravity or under pressure. The water to be treated is then led through the apparatus and the composition removes the undesirable cation. As concrete examples, hard water, i. e., water containing calcium and magnesium ions, when conducted through the product of this invention, has its hardness removed and the cations are replaced with sodium or hydrogen, according to whether the material has been regenerated with brine or acid; again, water containing dissolved lead or other appropriate metal may have its content of lead or such other metal extracted by this treatment and regeneration may be accomplished with a suitable reagent. In some cases e. g. after treatment with a solution containing a lead compound) acetic acid serves the purpose. After the material has reached its saturation point (with respect to the cation being adsorbed), it may be regenerated by leading a suitable solution through the apparatus.

The organic materials used herein as the tannin-containing substances are all well known to contain relatively large amounts of tannins. They all contain, in fact, more than 7% of tannins, and the extracts contain tannin in amount several times more than 7%. Analysis of various organic materials, showing the amount of tannins therein, will be found in "Chemical Dictionary" by Hackh, 2nd edition, 1937, page 914, et seq.

The following examples are illustrative of the invention and should not be construed to limit the invention as to scope or proportion.

*Example 1.*—One hundred parts of chestnut extract (powder) were stirred into 300 parts of concentrated sulphuric acid. The material became black and an exothermic reaction took place. After standing one-half hour it was poured into a large volume of water, and the precipitate filtered off, washed, and dried at 50° C. The hard lumps were crushed and screened to pass through 20 over 40 mesh. The classified material was further washed by decantation to eliminate semi-colloidal fines and then placed in a glass tube 2 cm. in diameter to form a column 10 cm. high. Distilled water was dripped through the material until the washings were free from acid. The base-exchange material was then ready to use.

As an illustration of such use, a solution of calcium sulphate containing 407 ppm. of hardness (calculated as calcium carbonate) was passed through the column, each 50 cc. portion of effluent being titrated with standard soap solution to determine hardness. A total of 450 cc. were softened. The column was regenerated by allowing 200 cc. of 10% sodium chloride solution to drip through, followed by distilled water until the washings were free of chloride. When tested again with the calcium sulphate solution, 600 cc. of the hard water were softened. After another regeneration cycle with sodium chloride, 950 cc. were softened. A third regeneration cycle allowed the calcium to be extracted from 1000 cc. of the water. After a fourth regeneration, 1200 cc. were softened.

The column was again treated with sodium chloride and then tested with a solution of lead acetate (2 g. per liter), 150 cc. passing through without the effluent showing any lead ions. The material was not saturated with lead, however. One hundred and fifty cc. of a solution containing 1 g. of gold chloride per liter were next passed through and no gold was found in the effluent.

*Example 2.*—The procedure of Example 1 was repeated, using quebracho extract (powder) in place of the chestnut extract. The base-exchange material had the same appearance as that of Example 1.

The following table shows the amount (expressed in cc.) of calcium sulphate solution of 400 ppm. hardness (calculated as calcium carbonate) softened per cycle, the column being regenerated with 200 cc. of 10% sodium chloride brine between each trial:

| Trial | Cubic centimeters water softened |
|---|---|
| 1 | 200 |
| 2 | 1,300 |
| 3 | 1,650 |
| 4 | 1,650 |

*Example 3.*—Example 1 was repeated using 100 parts of ground cutch instead of the chestnut extract. The first trial with water of 407 ppm. hardness showed 850 cc. softened. The base-exchange material was digested in 400 cc. of 5% calcium chloride solution, washed slightly by decantation, then digested further in 400 cc. of 10% sodium chloride brine. The material was returned to the glass tube and washed with distilled water until free from chlorides. A total of 750 cc. of water 400 ppm. hard was softened.

The column was regenerated with 200 cc. of 5% hydrochloric acid and washed free of excess acid. This time 1000 cc. of water (400 ppm.) were softened, an equivalent amount of acid being found in the effluent.

*Example 4.*—Fifty parts of quebracho extract were stirred into 200 parts of 80% ortho phosphoric acid and allowed to stand 18 hours. The mixture was poured into a large volume of water where a slight precipitate appeared, most of the material being water soluble. The precipitate was filtered off, washed, dried, and screened through 20 on 40 mesh. It was placed in a glass tube 2 cm. in diameter to form a column 5 cm. high. A solution of calcium sulphate (456 ppm. hardness, calculated as calcium carbonate) was dripped through and 300 cc. of the water were softened. After regeneration with 200 cc. of 10% sodium chloride brine, 500 cc. of water containing 435 ppm. hardness were softened.

*Example 5.*—As is well known, redwood contains a considerable amount of tannins. Fifty parts of redwood flour were stirred into 400 parts of concentrated sulphuric acid. The mixture became a thick gummy mass which was dumped into a large volume of water, washed, filtered, dried, and screened through 20 on 40 mesh. The material was placed in a glass tube 2 cm. in diameter to form a column 10 cm. high. On passing a calcium sulphate solution (456 ppm. hardness) through the column, only 50 cc. were softened. The base-exchange material was treated with 200 cc. of 5% calcium chloride and then digested in 400 cc. of 10% sodium chloride solution. It was repacked in the glass tube, washed free of chloride, and tested again with the calcium sulphate solution. Three hundred and fifty cc. were softened.

*Experiment 6.*—Experiment 5 was repeated using 80% ortho phosphoric acid instead of sulphuric acid. The material was dark brown colored instead of black. When tested as in Experiment 5, 500 cc. of calcium sulphate solution (containing 456 ppm. hardness as calcium carbonate) were passed through before calcium ions were found in the effluent. After regeneration with 200 cc. of 10% sodium chloride brine, 650 cc. of water containing 435 ppm. hardness were softened.

Experiment 7.—Experiment 5 was repeated using concentrated hydrochloric acid (instead of sulphuric). This material would not base-exchange even after activation and regeneration with sodium chloride. No calcium ion was absorbed by the material.

Experiment 8.—A portion of redwood flour was heated just below the kindling point until a dark brown color (but not black). Since the material was very powdery it was mixed with a cellulose acetate solution to cement the particles together, then ground and screened through 20 on 40 mesh. It was placed in a glass tube 2 cm. in diameter to form a column 10 cm. high, and tested with a solution of calcium sulphate (407 ppm. hardness) but no calcium ions were absorbed. The material was digested with 400 cc. of 5% calcium chloride and then with 400 cc. of 10% sodium chloride. After washing the column was again tested with calcium sulphate but no calcium was removed.

Experiment 9.—Experiment 8 was repeated using sawdust instead of redwood flour. The results were identical; no water was softened by this material.

Example 10.—One hundred parts of cane sugar were stirred into 200 parts of concentrated sulphuric acid and allowed to stand for 10 minutes. The product was a hard, vesiculated mass which was washed and dried at 55° C. The material was ground, screened through 20 on 40 mesh, and placed in a glass tube 2 cm. in diameter to form a column 10 cm. high. It was tested by dripping through it a solution of calcium sulphate containing 443 ppm. hardness. One hundred cc. of the hard water were softened. After regeneration with 10% sodium chloride 150 cc. were softened on the second run.

Example 11.—A sample of "Columbia Activated Carbon" was tested as in the foregoing examples and found to soften no water.

A sample of activated coconut charcoal was tested and also found to absorb no calcium.

The procedure of Example 5 was repeated using activated coconut charcoal instead of redwood. The charcoal was not sensitized by this treatment with sulphuric acid and did not soften any calcium sulphate water.

No claims are made herein to the base-exchange substance used in the process of the present case, such claims being made in a copending appl'n Ser. 119,131, filed Jan. 5, 1937.

What I claim is:

1. A process of removing a cation selected from the group consisting of calcium, magnesium, lead and gold, from an aqueous liquid containing the same which comprises bringing such aqueous liquid into contact with an organic base-exchange material which is a water-insoluble reaction product of one part of a material initially containing at least about 7% of tannins with several parts of an acid selected from the g consisting of concentrated sulphuric acid concentrated phosphoric acid, said acid l sufficiently concentrated to have dehydr properties, and said base-exchange materia ing produced by allowing said tannin-conta material and acid to react together, at sub: tially above room temperature but not a 150° C., until a dark colored insoluble re remains.

2. A process of removing a cation selected the group consisting of calcium, magnesium, and gold, from an aqueous liquid containin same which comprises bringing such aqu liquid into contact with an organic base-exch material which is a solid water-insoluble rea product of a material containing an insolubl action product of one part of a substan solid vegetable material containing over 7 tannin with several parts of a concentrated eral acid containing oxygen and which ac of sufficient concentration to have dehydr properties on said tannin material, and con ing such action of the acid on the tannir tract material, at substantially above room perature but at not over 150° C., until a colored water-insoluble solid material is lei 3. The process of softening water which prises subjecting hard water to the influen a base-exchange material which is a solid w insoluble reaction product of one part of a terial containing over 7% of tannin with se parts of concentrated sulphuric acid, reacte gether at substantially above room temper but at not over 150° C. to produce a dark co or black insoluble solid having base-excl properties.

4. The process of softening water which prises subjecting hard water to the influenc base-exchange material which is a solid insc material resulting from the reaction of one of a vegetable material containing at leas of tannin with several parts of a concent strong acid which has dehydrating black properties when applied to such tannin mat and which acid contains hydrogen, oxyger an element selected from the group of meta sulphur and phosphorus, and allowing rea to continue between said acid and said t material at above room temperature but a above 150° C., until a dark colored insoluble uct results, washing the soluble components said insoluble product, drying said insoluble uct and subjecting the said insoluble prodt repeated cycles of exhaustion and regener 5. The process of softening hard water comprises subjecting hard water to the infl of a base-exchanging material which is a insoluble reaction product of one part of a terial containing at least 7% of tannins several parts of a concentrated acid cor ing oxygen and sulphur, at substantially room temperature but at not above 150° C generating the base-exchanging material it has largely lost its power to soften wat treatment with an alkali-metal chloride thereafter subjecting hard water to the infl of the regenerated base-exchange materia

CARLETON EL